United States Patent
Zhang et al.

(10) Patent No.: US 12,425,169 B2
(45) Date of Patent: Sep. 23, 2025

(54) METHOD AND APPARATUS FOR TRANSMITTING AND RECEIVING SIDELINK FEEDBACK INFORMATION

(71) Applicant: FUJITSU LIMITED, Kawasaki (JP)

(72) Inventors: Jian Zhang, Beijing (CN); Pengyu Ji, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 17/981,334

(22) Filed: Nov. 4, 2022

(65) Prior Publication Data

US 2023/0057942 A1  Feb. 23, 2023

Related U.S. Application Data (63) Continuation of application No. PCT/CN2020/090380, filed on May 14, 2020.

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0061* (2013.01); *H04W 72/20* (2023.01); *H04W 72/23* (2023.01); *H04W 72/56* (2023.01)

(58) Field of Classification Search
CPC .... H04L 5/0055; H04L 1/0061; H04W 72/56; H04W 72/20; H04W 72/23
See application file for complete search history.

(56) References Cited

U.S. PATENT DOCUMENTS 11,057,870 B2 * 7/2021 Huang ................. H04L 1/1887
11,601,927 B2   3/2023 Lee
(Continued)

FOREIGN PATENT DOCUMENTS

CN  108696896 A  10/2018
CN  108696935 A  10/2018
(Continued)

OTHER PUBLICATIONS

International Search Report issued by the China National Intellectual Property Administration for corresponding International Patent Application No. PCT application No. PCT/CN2020/090380, mailed on Jan. 28, 2021, with an English translation.
(Continued)

*Primary Examiner* — Michael J Moore, Jr.
(74) *Attorney, Agent, or Firm* — Myers Wolin, LLC (57) ABSTRACT

A method and apparatus for transmitting and receiving sidelink feedback information. The method includes: receiving, by a terminal equipment, DCI with CRC being scrambled by a SL-RNTI or a SL-CS-RNTI; generating first indication information used for indicating that the first sidelink transmission is successful or that a network device is not needed to schedule retransmission, wherein the first sidelink transmission is not performed on the dynamic grant resource scheduled by the DCI, and a priority of the first indication information is preconfigured; and transmitting the first indication information via a first PUCCH indicated by the DCI.

20 Claims, 5 Drawing Sheets

(51) Int. Cl.
  *H04W 72/20* (2023.01)
  *H04W 72/23* (2023.01)
  *H04W 72/56* (2023.01)

(56) References Cited

U.S. PATENT DOCUMENTS

| | | | |
|---|---|---|---|
| 2019/0124015 A1 | 4/2019 | Loehr et al. | |
| 2020/0015176 A1 | 1/2020 | Li et al. | |
| 2020/0022161 A1 | 1/2020 | Yang et al. | |
| 2020/0099476 A1 | 3/2020 | Park | |
| 2020/0267597 A1* | 8/2020 | Huang | H04L 1/1812 |
| 2020/0313805 A1* | 10/2020 | Park | H04L 1/1812 |
| 2021/0136781 A1* | 5/2021 | Hosseini | H04W 72/56 |
| 2021/0168790 A1* | 6/2021 | Li | H04L 1/1861 |
| 2021/0321396 A1* | 10/2021 | Li | H04W 72/23 |
| 2022/0264559 A1 | 8/2022 | Lee | |
| 2022/0304001 A1* | 9/2022 | Lee | H04W 72/0446 |
| 2022/0368461 A1* | 11/2022 | Zhang | H04W 72/23 |
| 2022/0394700 A1* | 12/2022 | Ko | H04W 72/20 |
| 2023/0057942 A1* | 2/2023 | Zhang | H04W 72/20 |
| 2023/0319815 A1* | 10/2023 | Lee | H04L 1/1896 370/329 |

FOREIGN PATENT DOCUMENTS

| | | | | |
|---|---|---|---|---|
| CN | 108811138 A | 11/2018 | | |
| CN | 109314841 A | 2/2019 | | |
| CN | 110677905 A | 1/2020 | | |
| CN | 110856192 A | 2/2020 | | |
| CN | 110944390 A | 3/2020 | | |
| CN | 110944403 A | 3/2020 | | |
| CN | 111095834 A | 5/2020 | | |
| EP | 3634061 A1 * | 4/2020 | | H04L 1/1812 |
| WO | 2018/074876 A1 | 4/2018 | | |
| WO | WO-2018175553 A1 * | 9/2018 | | H04L 27/0006 |
| WO | 2019/069234 A1 | 4/2019 | | |
| WO | 2021/071194 A1 | 4/2021 | | |

OTHER PUBLICATIONS

First Notification of Office Action and Search Report issued by the China National Intellectual Property Administration for corresponding Chinese Patent Application No. 202080099888.2, mailed on Dec. 21, 2023, with an English translation.

The Extended European search report with the supplementary European search report and the European search opinion issued by the European Patent Office for corresponding European Patent Application No. 20935330.9-1213, mailed on Jun. 6, 2023.

Oppo, "Remaining issues of mode 1 resource allocation for NR-V2X", Agenda Item: 7.2.4.2.1, 3GPP TSG-RAN WG1 Meeting #100, R1-2000490, e-Meeting, Feb. 24-Mar. 6, 2020.

LG Electronics, Inc. (Rapporteur), "Report of [Post109e#21][V2X] Remaining MAC issues (LG)", Agenda Item: 6.4.3.1, 3GPP TSG-RAN WG2 Meeting #109B-e, R2-2003522, Online, Feb. 24-Mar. 6, 2020.

Lenovo et al., "Discussion on resource allocation for NR sidelink Mode 1", Agenda Item: 7.2.4.2.1, 3GPP TSG-RAN WG1 Meeting #98bis, R1-1910145, Chongqing, China, Oct. 14-20, 2019.

International Search Report and Written Opinion of the International Searching Authority issued by China National Intellectual Property Administration for corresponding International Patent Application No. PCT/CN2019/116614, mailed on Jul. 23, 2020, with an English translation.

Non-Final Office Action issued by the United States Patent and Trademark Office for corresponding U.S. Appl. No. 17/731,495, mailed on Jun. 20, 2024.

OPPO (rapporteur), "Summary of [106#77] UL/SL prioritization", Agenda Item 11.4.2, 3GPP TSG-RAN WG2 Meeting #107, R2-1908717, Prague, Czech Republic, Aug. 26-30, 2019.

Notice of Reasons for Refusal issued by the Japan Patent Office for corresponding Japanese Patent Application No. 2022-567132, mailed on Oct. 31, 2023, with an English translation.

CMCC, "Remaining issues on mode-1 resource allocation mechanism", Agenda Item: 7.2.4.2.1, 3GPP TSG-RAN WG1 #100bis, R1-2002205, e-Meeting, Apr. 20-30, 2020.

ZTE et al., "Remaining issues of mode 1 operation on sidelink", Agenda Item: 7.2.4.2.1, 3GPP TSG-RAN WG1 #100bis-e, R1-2001895, e-Meeting, Apr. 20-30, 2020.

Notice of Preliminary Rejection issued by the Korean Intellectual Property Office for corresponding Korean Patent Application No. 10-2022-7038879, mailed on May 13, 2025, with an English translation.

Final Office Action issued by the United States Patent and Trademark Office for corresponding U.S. Appl. No. 17/731,495, mailed on Dec. 11, 2024.

U.S. Appl. No. 62/911,359, filed Oct. 6, 2019.

* cited by examiner

METHOD AND APPARATUS FOR TRANSMITTING AND RECEIVING SIDELINK FEEDBACK INFORMATION

CROSS-REFERENCE TO RELATED APPLICATION

This application is a continuation application of International Application PCT/CN2020/090380 filed on May 14, 2020, and designated the U.S., the entire contents of which are incorporated herein by reference.

TECHNICAL FIELD

This disclosure relates to the field of communication technologies.

BACKGROUND

V2X (Vehicle to Everything) is a vehicle communication technology. Compared with the cellular communication using Uu links (including uplinks and downlinks), a transmitting terminal equipment of V2X communicates directly with a receiving terminal equipment via a sidelink.

New Radio (NR) V2X is an important project of 5G NR. Compared with Long Term Evolution (LTE) V2X, NR V2X needs to support many new scenarios and new services, and needs to meet higher technical indicators.

NR V2X defines a number of physical channels, including a physical sidelink control channel (PSCCH), a physical sidelink shared channel (PSSCH), and a physical sidelink feedback channel (PSFCH), which are respectively used to carry sidelink control information (SCI), sidelink data and sidelink feedback information (such as HARQ-ACK).

NR V2X defines two operational modes. For NR V2X mode 1, a time-frequency resource (referred to as a resource in brief) used by a terminal equipment for V2X communication is scheduled and allocated by a network device (e.g. a base station) via an NR Uu link, and the terminal equipment may feed back ACK/NACK via a physical uplink control channel (PUCCH). And for NR V2X mode 2, a terminal equipment may autonomously select time-frequency resources for V2X communication based on sensing results.

Mode 1 includes two manners, dynamic grant (DG) and configured grant (CG, or referred to as grant-free). And the terminal equipment may use a dynamic grant resource or a configured grant resource for sidelink transmission (including initial transmission or retransmission).

For the dynamic grant, the network device schedules sidelink resources via a physical downlink control channel (PDCCH) or downlink control information (DCI). And for the configured grant, the network device configures periodic sidelink resources via radio resource control (RRC) signaling, and the terminal equipment may directly use the configured resources for PSSCH transmission, without requesting the network device via a scheduling request for sidelink resources.

The terminal equipment may obtain the ACK/NACK information of the PSSCH by receiving the PSFCH, and transmit the sidelink ACK/NACK information carried by the PSFCH to the network device via the PUCCH. For a dynamic grant, the network device indicates PUCCH resources via the PDCCH. And for the configured grant, PUCCH resources may be configured via RRC in each period of the configured grant.

No matter the dynamic grant or the configured grant, after receiving the NACK carried by the PUCCH, the network device may use the dynamic grant to schedule sidelink retransmissions (via the PDCCH), and may indicate PUCCH resources associated with the retransmission resources in the PDCCH. If the NACK continues to be received on the PUCCH, the network device may continue to schedule retransmission, and the network device may autonomously decide a maximum number of times of retransmission scheduling.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that the terminal equipment may possibly also need to perform sidelink transmission while transmitting the PUCCH carrying the sidelink HARQ-ACK. As the terminal equipment is limited with respect to maximum transmit power, the terminal equipment will perform priority comparison and decide to drop the party with a lower priority according to a result of the priority comparison. That is, the terminal equipment will drop the PUCCH transmission, or drop the sidelink transmission, so that the transmit power does not exceed the maximum power limit.

When the above priority comparison process causes drop of the PUCCH carrying the sidelink ACK, the network device will continue to schedule the sidelink retransmission due to not receiving any ACK/NACK. However, as the terminal equipment receives the ACK on the physical sidelink feedback channel, no data need to be transmitted at this moment, hence, the retransmission scheduled by the network device is completely unnecessary. Since these scheduled retransmission resources are unable to be utilized by any device, unnecessary waste of resources will be incurred.

In order to solve at least one of the above problems, embodiments of this disclosure provide a method and apparatus for transmitting and receiving sidelink feedback information.

According to an aspect of the embodiments of this disclosure, there is provided a method for transmitting sidelink feedback information, including:

receiving, by a terminal equipment, downlink control information with cyclic redundancy check being scrambled by a sidelink radio network temporary identifier or a sidelink configuration scheduling radio network temporary identifier; wherein the downlink control information indicates a dynamic grant resource and schedules the terminal equipment to perform first sidelink transmission by using the dynamic grant resource;

generating first indication information used for indicating that the first sidelink transmission is successful or that a network device is not needed to schedule retransmission, wherein the first sidelink transmission is not performed on the dynamic grant resource scheduled by the downlink control information, and a priority of the first indication information is preconfigured; and transmitting the first indication information via a first physical uplink control channel indicated by the downlink control information.

According to another aspect of the embodiments of this disclosure, there is provided an apparatus for transmitting sidelink feedback information, including:
- a receiving unit configured to receive downlink control information with cyclic redundancy check being scrambled by a sidelink radio network temporary identifier or a sidelink configuration scheduling radio network temporary identifier; wherein the downlink control information indicates a dynamic grant resource and schedules a terminal equipment to perform first sidelink transmission by using the dynamic grant resource;
- an indication generating unit configured to generate first indication information used for indicating that the first sidelink transmission is successful or that a network device is not needed to schedule retransmission, wherein the first sidelink transmission is not performed on the dynamic grant resource scheduled by the downlink control information, and a priority of the first indication information is preconfigured; and
- a transmitting unit configured to transmit the first indication information via a first physical uplink control channel indicated by the downlink control information.

According to a further aspect of the embodiments of this disclosure, there is provided a method for receiving sidelink feedback information, including:
- transmitting, by a network device, downlink control information with cyclic redundancy check being scrambled by a sidelink radio network temporary identifier or a sidelink configuration scheduling radio network temporary identifier; wherein the downlink control information indicates a dynamic grant resource and schedules a terminal equipment to perform sidelink transmission by using the dynamic grant resource; and
- receiving indication information transmitted via a physical uplink control channel indicated by the downlink control information;
- wherein the dynamic grant resource scheduled by the downlink control information is not used by the terminal equipment to perform the sidelink transmission, the indication information is used by the terminal equipment to indicate that the sidelink transmission is successful or that a network device is not needed to schedule retransmission, and a priority of the indication information is preconfigured.

According to still another aspect of the embodiments of this disclosure, there is provided an apparatus for receiving sidelink feedback information, including:
- a transmitting unit configured to transmit downlink control information with cyclic redundancy check being scrambled by a sidelink radio network temporary identifier or a sidelink configuration scheduling radio network temporary identifier; wherein the downlink control information indicates a dynamic grant resource and schedules a terminal equipment to perform sidelink transmission by using the dynamic grant resource; and
- a receiving unit configured to receive indication information transmitted via a physical uplink control channel indicated by the downlink control information;
- wherein the dynamic grant resource scheduled by the downlink control information is not used by the terminal equipment to perform the sidelink transmission, the indication information is used by the terminal equipment to indicate that the sidelink transmission is successful or that a network device is not needed to schedule retransmission, and a priority of the indication information is preconfigured.

An advantage of the embodiments of this disclosure exists in that the terminal equipment feeds back indication information (ACK) on a PUCCH with which a resource having no data to be transmitted is associated, a priority of the indication information being preconfigured. Hence, erroneously continuously scheduling resources by the network device may be reduced or avoided, and waste of sidelink resources may be lowered.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. "Device" may refer to a network device, or may refer to a terminal equipment, unless otherwise specified.

Scenarios in the embodiments of this disclosure shall be described below by way of examples; however, this disclosure is not limited thereto.

Figure 1:
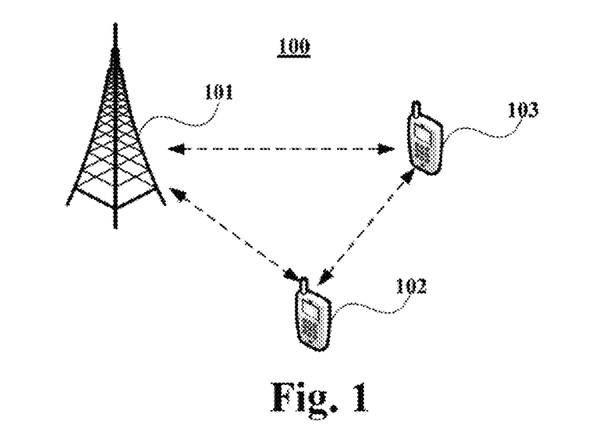
FIG. 1 is schematic diagram of a communication system of an embodiment of this disclosure.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiments of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

It should be noted that FIG. 1 shows that two terminal equipments 102, 103 are both within coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between the two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

In the embodiments of this disclosure, the terminal equipments 102 and/or 103 may be allocated with sidelink resources by the network device (that is, in mode 1), or may autonomously select sidelink resources (i.e. in mode 2). Of course, autonomous selection of sidelink resources (i.e. in mode 2) and allocation of sidelink resources by the network device (i.e. in mode 1) may also combined in the embodiments of this disclosure; however, the embodiments of this disclosure is not limited thereto.

For a dynamic grant, the network device schedules sidelink resources via a PDCCH, and cyclic redundancy check (CRC) of the PDCCH is scrambled by a sidelink radio network temporary identifier (SL-RNTI). For a configured grant, an occasion of the PUCCH transmission may be configured via RRC in each period, and according to ACK/NACK carried by the PUCCH, the network device may schedule retransmission resources (via the PDCCH) by using the dynamic grant, and may indicate PUCCH resources related to the retransmission resources in the PDCCH, the CRC of the PDCCH is scrambled by a sidelink configured scheduling radio network temporary identifier (SL-CS-RNTI).

For the sake of simplicity, PSCCH/PSSCH resources configured by RRC in the configured grant are hereinafter referred to as configured grant resources, and PSCCH/PSSCH resources scheduled by the network device in the configured grant are referred to as dynamic grant resources.

A priority of the PUCCH is defined as a highest priority in all sidelink HARQ-ACK carried by the PUCCH. For a certain piece of sidelink HARQ-ACK carried in the PUCCH, its priority is equal to a priority of a PSFCH with which it is associated, and is also equal to a priority of a PSSCH with which it is associated.

More specifically, for HARQ-ACK of a PSSCH, it is carried by a PSFCH and is also carried by a PUCCH. Therefore, the HARQ-ACK in the above PUCCH, PSFCH and PSSCH are associated, the PSSCH (PSFCH) is the PSSCH (PSFCH) with which the above HARQ-ACK is associated, and priorities of them are identical. For a PSSCH, there is a priority field in the PSCCH (SCI) scheduling the PSSCH, a priority indicated by this field being a priority of the PSSCH.

Therefore, for sidelink HARQ-ACK carried in the PUCCH, its priority is actually derived from a priority indicated by the priority field of the SCI. For sidelink transmission, as described above, the priorities of the PSCCH, PSSCH and PSFCH may all be attributed to being derived from the priorities indicated by the priority field the SCI. For a synchronization signal block (SSB) and channel state information (CSI) of the sidelink, their priorities are (pre)configured. Therefore, the priority of the PUCCH may directly be compared with the priority of the sidelink transmission.

However, when the above priority comparison process causes drop of the PUCCH carrying the sidelink ACK, the network device will continuously schedule the sidelink retransmission due to not receiving any ACK/NACK; however, as the terminal equipment has received the ACK, the terminal equipment has no data to transmit at this moment, hence, the retransmission scheduled by the network device is completely unnecessary. As these scheduled retransmission resources are unable to be utilized by any device, unnecessary waste of resources will be incurred.

Figure 2:
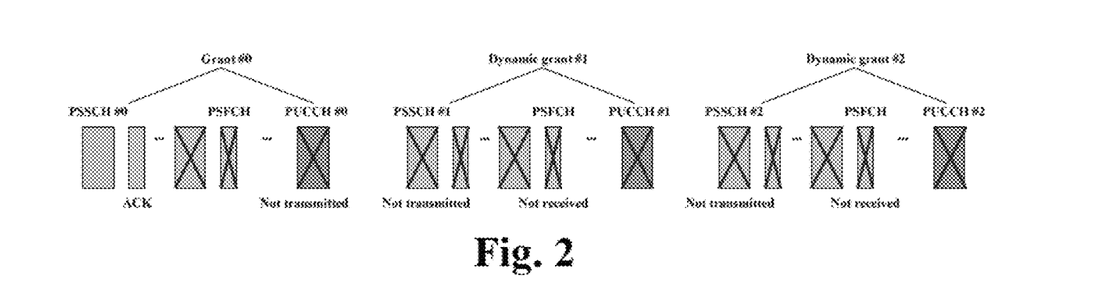
FIG. 2 is an exemplary diagram of feedback information transmission of an embodiment of this disclosure.

FIG. 2 is an exemplary diagram of feedback information transmission of an embodiment of this disclosure. As shown in FIG. 2, a base station allocates resources (PSSCH #0, etc.) via grant #0 for PSCCH/PSSCH transmission to a terminal equipment, and allocates a PUCCH resource (PUCCH #0). Wherein, grant #0 may be a dynamic grant or a configured grant. The dynamic grant is based on DCI scheduling, and the configured grant is based on RRC configuration.

As shown in FIG. 2, after the terminal equipment transmits PSSCH #0, it receives ACK on a PSFCH, therefore, the terminal equipment does not need to continue to transmit retransmissions on a PSSCH resource after PSSCH #0. The terminal equipment should transmit the ACK on PUCCH #0; however, as PUCCH #0 temporally overlaps other sidelink transmissions and/or uplink transmissions and a priority of PUCCH #0 is relatively low, the terminal equipment drops PUCCH #0, that is, the terminal equipment performs no transmission on PUCCH #0.

Correspondingly, the base station receives no ACK or NACK on PUCCH #0, which is actually a discontinuous transmission (DTX) for the base station, so the base station may deem that the resources allocated to the terminal equipment by grant #0 are not sufficiently ideal, so that the terminal equipment is continuously scheduled to perform retransmission. The initial transmission and retransmission in this text are for the same HARQ process, that is, for the same transport block (TB).

As shown in FIG. 2, the base station schedules dynamic grant #1 via DCI, and allocates retransmission resources and PUCCH resources to the terminal equipment. However, as the terminal equipment has received the ACK on the PSFCH, the terminal equipment may have emptied a buffer, hence, it has no data to transmit. If there exists no provision for behaviors of the terminal equipment at this moment, the terminal equipment will find that transmission conditions are not satisfied, and therefore will not perform any transmission on the PSSCH resources and PUCCH resources allocated by dynamic grant #1.

As the terminal equipment does not report the HARQ-ACK to the base station on PUCCH #1, the base station will still deem it as DTX, and thus continue to schedule dynamic grant #2. Similarly, as the terminal equipment still does not transmit HARQ-ACK on the PUCCH, the base station may continue to schedule dynamic grant #3, and dynamic grant #4, etc. However, these continuously scheduled retransmissions are unnecessary, and the allocated retransmission resources are unable to be used by any device, thereby causing great waste of resources. The embodiments of this disclosure will provide corresponding solutions therefor.

In the embodiments of this disclosure, the sidelink is described by taking V2X as an example; however, this disclosure is not limited thereto, and it may also be applicable to sidelink transmission scenarios other than V2X. In the following description, without causing confusion, terms "sidelink" and "V2X" are interchangeable, terms "PSFCH" and "sidelink feedback channel" are interchangeable, terms "PSCCH" and "sidelink control channel" or "sidelink control information" are interchangeable, and terms "PSSCH" and "sidelink data channel" or "sidelink data" are interchangeable. In addition, transmitting or receiving a PSSCH may be understood as transmitting or receiving sidelink data carried by the PSSCH, and transmitting or receiving a PSFCH may be understood as transmitting or receiving sidelink feedback information carried by the PSFCH.

Embodiments of a First Aspect

The embodiments of this disclosure provide a method for transmitting sidelink feedback information, which shall be described from a terminal equipment. The terminal equipment (which may also be referred to as a transmitting terminal equipment) may be taken as a transmitter of service data to transmit sidelink data to one or more other terminal equipments (which may also be referred to as receiving terminal equipments). The terminal equipment (which may also be referred to as a transmitting terminal equipment) may receive a dynamic grant from a network device, and transmit feedback information to the network device.

Figure 3:
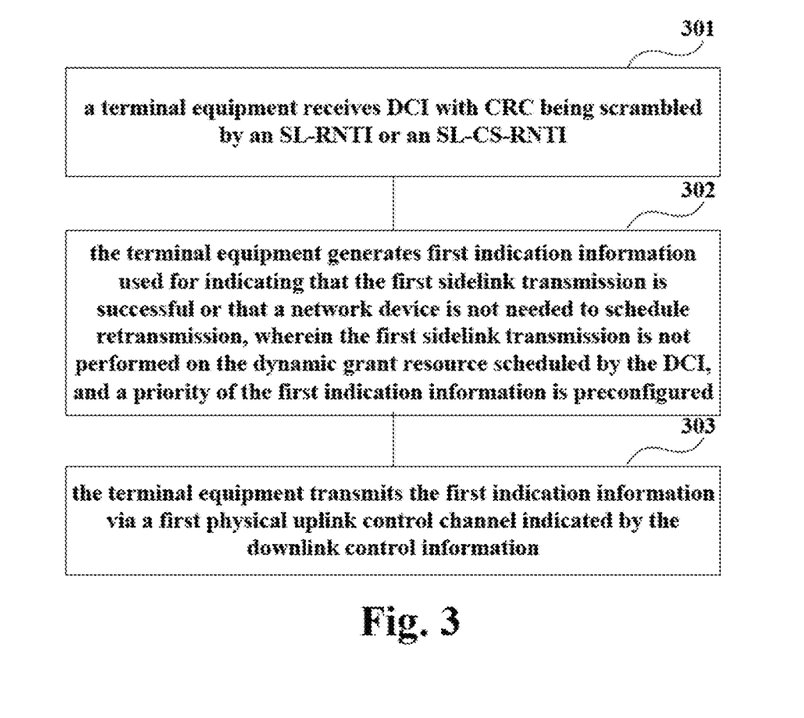
FIG. 3 is a schematic diagram of the method for transmitting sidelink feedback information of an embodiment of this disclosure.

FIG. 3 is a schematic diagram of the method for transmitting sidelink feedback information of the embodiment of this disclosure. As shown in FIG. 3, the method includes:

301: a terminal equipment receives downlink control information (DCI) with CRC being scrambled by an SL-RNTI or an SL-CS-RNTI; wherein the downlink control information indicates a dynamic grant resource and schedules the terminal equipment to perform first sidelink transmission by using the dynamic grant resource;

302: the terminal equipment generates first indication information used for indicating that the first sidelink transmission is successful or that a network device is not needed to schedule retransmission, wherein the first sidelink transmission is not performed on the dynamic grant resource scheduled by the downlink control information, and a priority of the first indication information is preconfigured; and 303: the terminal equipment transmits the first indication information via a first physical uplink control channel indicated by the downlink control information.

It should be noted that FIG. 3 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 3.

In some embodiments, sidelink transmission is performed via a physical sidelink control channel and/or a physical sidelink shared channel, and reference may be made to related technologies for specific contents of sidelink transmission and reception.

Therefore, the terminal equipment feeds back indication information (ACK) on the PUCCH associated with the resource having no data to be transmitted, and the priority of the indication information is preconfigured. In this way, erroneously continuously scheduling resources by the network device may be reduced or avoided, and waste of sidelink resources may be lowered.

Figure 4:
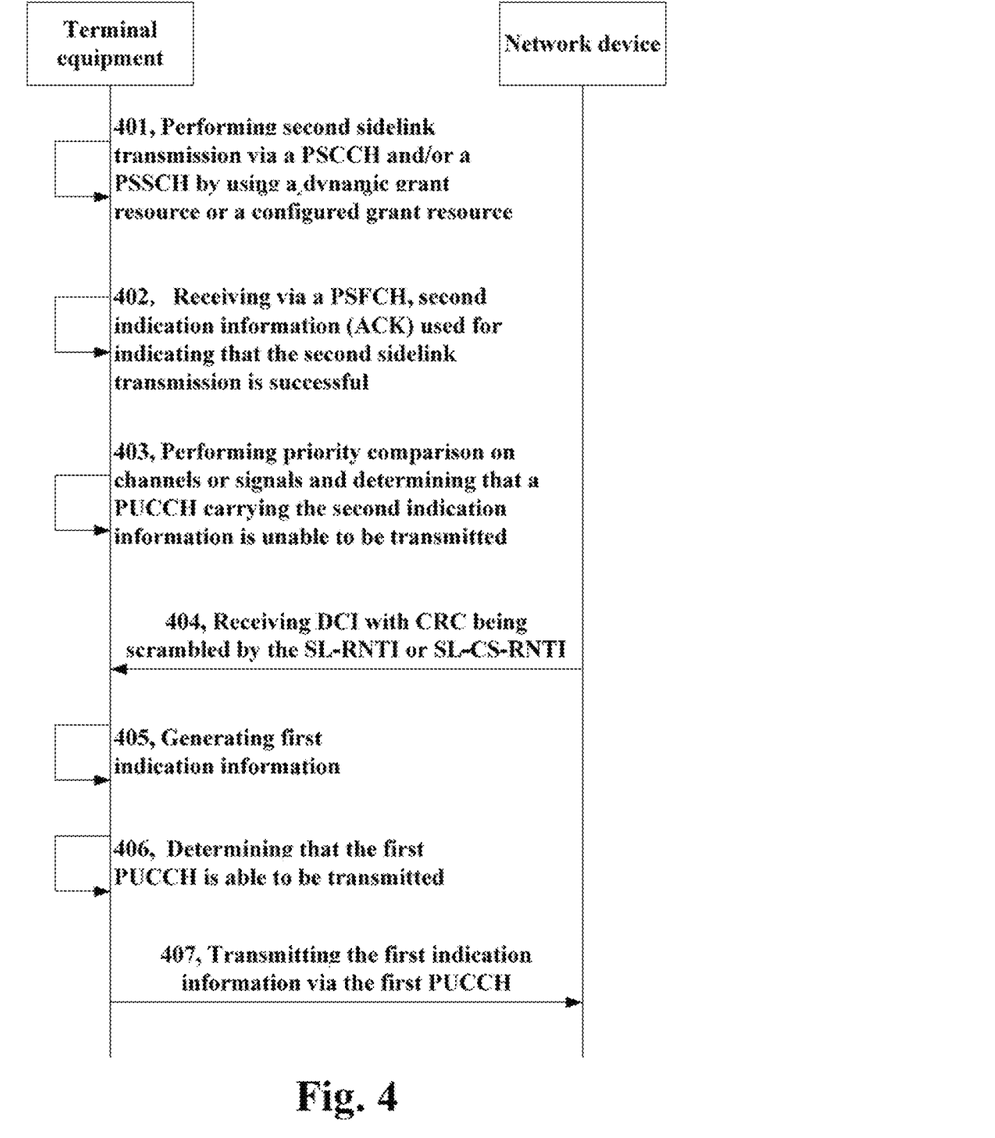
FIG. 4 is a schematic diagram of a method for transmitting and receiving sidelink feedback information of an embodiment of this disclosure.

FIG. 4 is a schematic diagram of a method for transmitting and receiving sidelink feedback information of the embodiment of this disclosure. As shown in FIG. 4, the method includes:

401: the terminal equipment performs second sidelink transmission via a PSCCH and/or a PSSCH by using a dynamic grant resource or a configured grant resource;

402: the terminal equipment receives via a PSFCH, second indication information (ACK) used for indicating that the second sidelink transmission is successful; and 403: the terminal equipment performs priority comparison on channels or signals and determining that a PUCCH carrying the second indication information is unable to be transmitted.

As shown in FIG. 4, the method further includes:

404: the terminal equipment receives the downlink control information (DCI) with CRC being scrambled by the SL-RNTI or SL-CS-RNTI; wherein the downlink control information indicates dynamic grant resources, and schedules the terminal equipment to use the dynamic grant resources to perform first sidelink transmission via a physical sidelink control channel and/or a physical sidelink shared channel;

405: the terminal equipment generates, first indication information for indicating that the first sidelink transmission is successful or the network device is not needed to schedule retransmission, wherein the first sidelink transmission is not performed on the dynamic grant resource scheduled by the downlink control information, and a priority of the first indication information is preconfigured.

In some embodiments, when the first physical uplink control channel overlaps with other uplink transmissions or sidelink transmissions, priority comparison of channels or signals may further be performed. Of course, if there exists no overlapping of time-frequency resources, priority comparison of channels or signals may not be performed.

In some embodiments, as shown in FIG. 4, the method further includes:

406: the terminal equipment determines that the first physical uplink control channel indicated by the downlink control information is able to be transmitted;

407: the terminal equipment transmits the first indication information via the first physical uplink control channel.

In some embodiments, the terminal equipment determines that the first physical uplink control channel indicated by the downlink control information cannot be transmitted, in which case the terminal equipment does not transmit the first physical uplink control channel carrying the first indication information. For example, the terminal equipment transmits a channel or signal overlaps with the first physical uplink control channel, the channel or signal being uplink transmission or sidelink transmission.

It should be noted that FIG. 4 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4.

In the embodiments of this disclosure, for example, when the terminal equipment receives a dynamic grant from a base station and the dynamic grant schedules PSSCH resources and PUCCH resources, if the terminal equipment does not perform sidelink transmission on any PSSCH resource scheduled by the dynamic grant, the terminal equipment transmits ACK to the base station on the PUCCH scheduled by the dynamic grant. When the ACK transmission temporally overlaps with other sidelink transmissions or uplink transmissions, priority comparison needs to be performed and some transmissions need to be dropped, the ACK is deemed as having a lowest sidelink priority.

Figure 5:
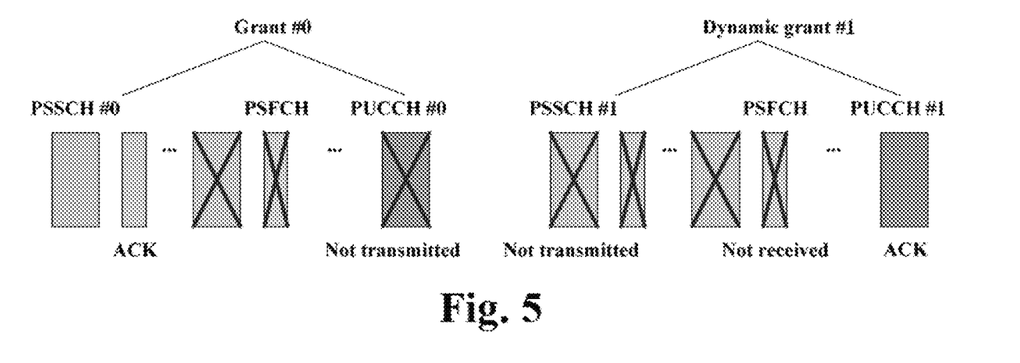
FIG. 5 is another exemplary diagram of the feedback information transmission of the embodiment of this disclosure.

FIG. 5 is an exemplary diagram of the feedback information transmission of the embodiment of this disclosure, in which some contents are assumed to be identical to FIG. 2 and shall not be described any further. As shown in FIG. 5, after receiving dynamic grant #1, the terminal equipment finds that there exists no data needing to be transmitted, hence, the terminal equipment does not perform sidelink transmission on the PSSCH resource allocated by dynamic grant #1, but the terminal equipment will transmit ACK to the base station on the PUCCH resource (PUCCH #1) allocated by dynamic grant #1, that is, the base station is notified that it does not need to continue to schedule retransmission. After the base station receives the ACK, it will not continue to schedule retransmission, that is, it will not continue to schedule dynamic grant #2, hence, a problem of continuously scheduling unnecessary retransmissions will not occur.

The terminal equipment does not transmit ACK on PUCCH #0 scheduled by dynamic grant #0, but the terminal equipment does not need to record and save an ACK result until a moment when it is transmitted on PUCCH #1. On the contrary, after receiving dynamic grant #1, the terminal equipment finds that there exists no data needing to be transmitted, and may transmit ACK on PUCCH #1, and the terminal equipment is not needed to perform an additional operation of recording and saving the ACK result.

In this way, it may be avoided that the base station continuously schedules unnecessary retransmissions, and waste of resources resulted therefrom may also be avoided.

In some embodiments, the first sidelink transmission and the second sidelink transmission have identical hybrid automatic repeat request (HARQ) process IDs.

In some embodiments, a new data indication (NDI) field of the DCI scrambled by the SL-RNTI does not toggle (NDI does not toggle), and a value of an NDI field of the DCI scrambled by the SL-CS-RNTI is 1. Thus, the first sidelink transmission may be indicated to be of retransmission.

In some embodiments, a priority of the second indication information (ACK) is determined according to a priority indication field in the physical sidelink control channel.

In some embodiments, the priority of the first indication information is preconfigured to be a lowest sidelink priority.

For example, sidelink priority values may be defined as being 0-7; wherein, 0 denotes that a sidelink priority is highest, and 7 denotes that a sidelink priority is lowest, and a priority value of the first indication information (ACK) may be configured as being 7.

In some embodiments, the priority of the first indication information is preconfigured as a sidelink priority.

For example, the sidelink priority values may be defined as being 0-7; wherein, 0 denotes that the sidelink priority value is highest, and 7 denotes that the sidelink priority value is lowest, hence, the sidelink priority value of the first indication information (ACK) may be configured as a value between 0 and 7.

In some embodiments, the priority of the first physical uplink control channel is determined at least according to the priority of the first indication information. For example, the first physical uplink control channel only carries the first indication information, and the priority of the first physical uplink control channel is equal to the priority of the first indication information.

For example, for the above PUCCH (PUCCH #1) carrying the ACK, it may also temporally overlap with other sidelink transmissions or uplink transmissions, which results in that the terminal equipment needs to drop according to priorities. Therefore, it is needed to determine the priority of PUCCH #1. As the terminal equipment does not transmit on the PSSCH resource scheduled by dynamic grant 1, there exists no PSSCH associated with the ACK carried by PUCCH #1, thus, the priority of the ACK is unable to be determined according to the priority of the PSSCH. Hence, if there is no provision thereof, undefined equipment behaviors will occur when the terminal equipment determines the priority of PUCCH #1, causing uncertainties in priority ordering.

In the embodiments of this disclosure, as the above ACK has no PSSCH associated with it, the priority of the ACK may be defined as being always equal to a lowest sidelink priority, that is, the priority of the ACK is lowest in all sidelink priorities; however, this disclosure is not limited thereto.

In some embodiments, after the terminal equipment performs channel or signal priority comparison, if it determines that the first physical uplink control channel indicated by the downlink control information is unable to be transmitted; it may transmit a channel or signal overlapping with the first physical uplink control channel, such as uplink transmission or sidelink transmission. That is, in a case where the first physical uplink control channel indicated by the downlink control information is unable to be transmitted, the first physical uplink control channel carrying the first indication information is not transmitted.

Figure 6:
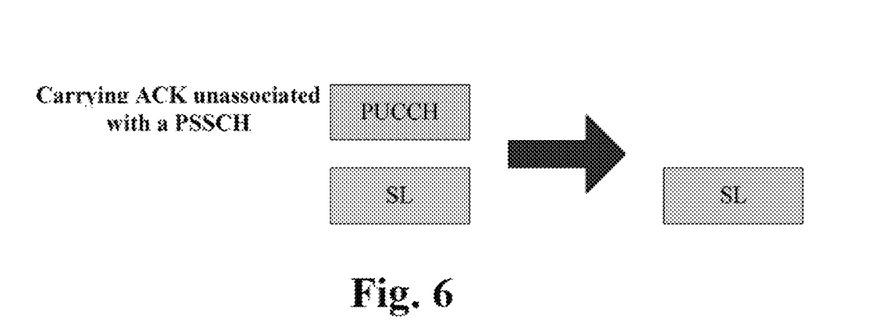
FIG. 6 is a schematic diagram of priority comparison of an embodiment of this disclosure.

FIG. 6 is a schematic diagram of priority comparison of the embodiment of this disclosure. As shown in FIG. 6, since the terminal equipment has no data needing to be transmitted, ACK is transmitted on the PUCCH, and the PUCCH carries only the ACK (the PUCCH carries ACK unassociated with a PSSCH). When the PUCCH and sidelink transmissions temporally overlap and some transmissions therein need to be dropped, as the ACK carried by the PUCCH has the lowest sidelink priority, the terminal equipment drops the PUCCH and performs sidelink transmission only.

Therefore, it may be ensured that the other channels or signals (e.g. uplink transmission or sidelink transmission) may be transmitted reliably. Since the network device still has not received the first indication information (ACK), a dynamic grant may possibly be transmitted again, and the terminal equipment may wait for the dynamic grant, and then transmit the first indication information (ACK) on a corresponding PUCCH.

In some embodiments, the first physical uplink control channel carries multiple pieces of feedback information, and the first indication information has the lowest sidelink priority in the multiple pieces of feedback information. The priority of the first physical uplink control channel is equal to a highest priority in the multiple pieces of feedback information carried by the first physical uplink control channel.

For example, the PUCCH may possibly also carry multiple HARQ-ACK bits. For example, the PUCCH carries an HARQ-ACK codebook, and at this moment, the priority of the PUCCH is a highest priority in all HARQ-ACK. In comparing priorities of multiple pieces of HARQ-ACK carried in the PUCCH, if the PUCCH contains ACK resulted due to the above reasons, a priority of the ACK is deemed as being the lowest sidelink priority, and then it is compared with priorities of other HARQ-ACK.

As a result, undefined device behaviors during sidelink priority comparison may be avoided, and uncertainties in priory ordering may be avoided.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment feeds back the indication information (ACK) on the PUCCH associated with the resource having no data to be transmitted, and the priority of the indication information is preconfigured. Hence, erroneously continuously scheduling resources by the network device may be reduced or avoided, and waste of sidelink resources may be lowered.

Embodiments of a Second Aspect

The embodiments of this disclosure provide a method for transmitting sidelink feedback information, which may be implemented in combination with the embodiments of the first aspect, or may be implemented independently, with contents identical to those in the embodiments of the first aspect being not going to be described herein any further.

In some embodiments, a terminal equipment generates indication information (NACK) indicating that sidelink transmission is unsuccessful; wherein sidelink data of the sidelink transmission are not transmitted (e.g. such as being dropped); and the terminal equipment transmits the indication information (NACK) via an uplink control channel; wherein a priority of the indication information is configured as a priority of a logical channel.

As described above, for sidelink HARQ-ACK carried in a PUCCH, its priority is actually derived from a priority indicated by a priority field of SCI. However, for the following cases, the priority field of the SCI is unable to be used to determine the priority of the HARQ-ACK.

For example, when the terminal equipment drops sidelink transmission according to a priority rule for data transmission (that is, the terminal equipment does not perform sidelink transmission), the terminal equipment needs to transmit NACK to the network device via the PUCCH. However, as the terminal equipment drops the sidelink transmission in a stage of generating a logical channel, and the terminal equipment has not yet generated the SCI at this moment, it is unable to determine the sidelink HARQ-ACK in the PUCCH based on the priority field of the SCI.

In some embodiments, to address this issue, the terminal equipment may determine the priority of the sidelink HARQ-ACK (NACK) in the PUCCH to be equal to the priority of the dropped logical channel. As a result, undefined device behaviors during sidelink priority comparison may be avoided, and uncertainties in priory ordering may be avoided.

Embodiments of a Third Aspect

The embodiments of this disclosure provide a method for receiving sidelink feedback information, which shall be described from a network device, with contents identical to those in the first and second aspects being not going to be described herein any further.

Figure 7:
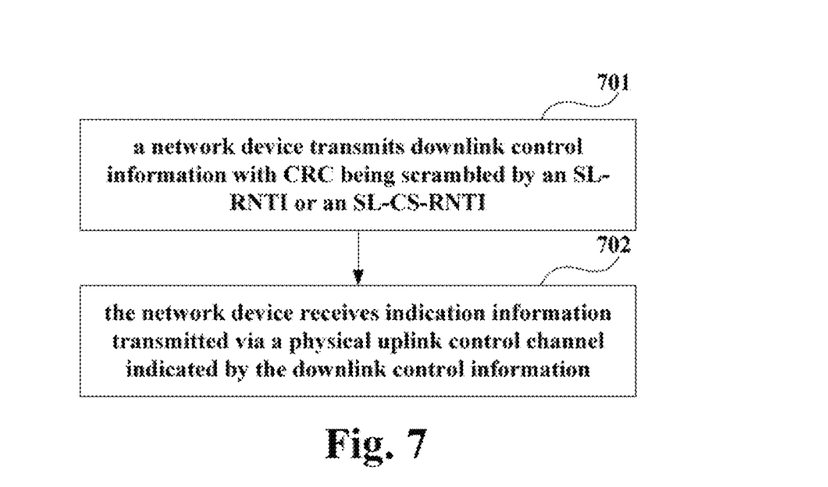
FIG. 7 is a schematic diagram of the method for receiving sidelink feedback information of an embodiment of this disclosure.

FIG. 7 is a schematic diagram of the method for receiving sidelink feedback information of the embodiment of this disclosure. As shown in FIG. 7, the method includes:

701: a network device transmits downlink control information with CRC being scrambled by an SL-RNTI or an SL-CS-RNTI; wherein the downlink control information indicates a dynamic grant resource and schedules a terminal equipment to perform sidelink transmission by using the dynamic grant resource; and 702: the network device receives indication information transmitted via a physical uplink control channel indicated by the downlink control information;

wherein the dynamic grant resource scheduled by the downlink control information is not used by the terminal equipment to perform the sidelink transmission, the indication information is used by the terminal equipment to indicate that the sidelink transmission is successful or that a network device is not needed to schedule retransmission, and a priority of the indication information is preconfigured.

In some embodiments, the priority of the indication information is preconfigured to be of a lowest sidelink priority.

In some embodiments, the priority of the physical uplink control channel is determined at least according to the priority of the indication information.

In some embodiments, the physical uplink control channel only carries the indication information, and the priority of the physical uplink control channel is equal to the priority of the indication information.

In some embodiments, the physical uplink control channel carries multiple pieces of feedback information, and the priority of the physical uplink control channel is equal to a highest priority in the multiple pieces of feedback information carried by the physical uplink control channel.

In some embodiments, a new data indication (NDI) field of the DCI scrambled by the SL-RNTI does not toggle (NDI does not toggle), and a value of an NDI field of the DCI scrambled by the SL-CS-RNTI is 1.

It should be noted that FIG. 7 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment feeds back the indication information (ACK) on the PUCCH associated with the resource having no data to be transmitted, and the priority of the indication information is preconfigured. Hence, erroneously continuously scheduling resources by the network device may be reduced or avoided, and waste of sidelink resources may be lowered.

Embodiments of a Fourth Aspect

The embodiments of this disclosure provide an apparatus for transmitting sidelink feedback information. The apparatus may be, for example, a terminal equipment, or may be one or more components or assemblies configured in a terminal equipment. Contents in the embodiments identical to those in the embodiments of the first and second aspects shall not be described herein any further.

Figure 8:
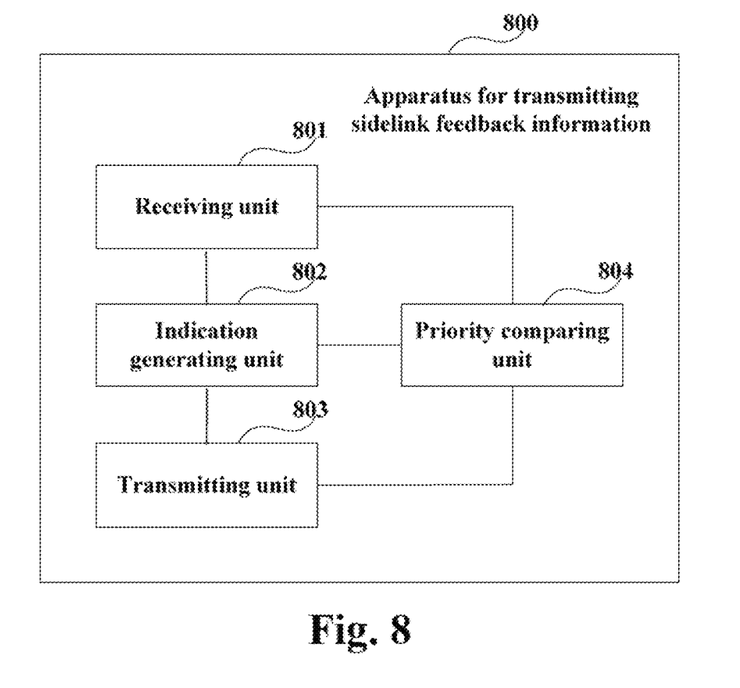
FIG. 8 is a schematic diagram of the apparatus for transmitting sidelink feedback information of an embodiment of this disclosure.

FIG. 8 is a schematic diagram of the apparatus for transmitting sidelink feedback information of an embodiment of this disclosure. As shown in FIG. 8, the apparatus 800 for transmitting sidelink feedback information includes:

a receiving unit 801 configured to receive downlink control information with cyclic redundancy check being scrambled by a sidelink radio network temporary identifier or a sidelink configuration scheduling radio network temporary identifier; wherein the downlink control information indicates a dynamic grant resource and schedules a terminal equipment to perform first sidelink transmission by using the dynamic grant resource;

an indication generating unit 802 configured to generate first indication information used for indicating that the first sidelink transmission is successful or that a network device is not needed to schedule retransmission, wherein the first sidelink transmission is not performed on the dynamic grant resource scheduled by the downlink control information, and a priority of the first indication information is preconfigured; and a transmitting unit 803 configured to transmit the first indication information via a first physical uplink control channel indicated by the downlink control information.

In some embodiments, as shown in FIG. 8, the apparatus 800 for transmitting sidelink feedback information may further include:

a priority comparing unit 804 configured to perform priority comparison on channels or signals to determine whether the first physical uplink control channel indicated by the downlink control information is able to be transmitted; wherein, a priority of the first physical uplink control channel is determined at least according to a priority of the first indication information.

In some embodiments, the priority of the first indication information is preconfigured as a lowest sidelink priority.

In some embodiments, the first physical uplink control channel carries only the first indication information, and the priority of the first physical uplink control channel is equal to the priority of the first indication information.

In some embodiments, the first physical uplink control channel carries multiple pieces of feedback information, and the priority of the first physical uplink control channel is equal to a highest priority of the multiple pieces of feedback information carried by the first physical uplink control channel.

In some embodiments, the transmitting unit 803 is further configured to perform second sidelink transmission via a physical sidelink control channel and/or a physical sidelink shared channel by using a dynamic grant resource or a configured grant resource;

the receiving unit 801 is further configured to, via a physical sidelink feedback channel, receive second indication information used for indicating that the second sidelink transmission is successful;

and the priority comparing unit 804 is further configured to perform priority comparison on channels or signals and determine that a second physical uplink control channel carrying the second indication information is unable to be transmitted.

In some embodiments, the second sidelink transmission is performed before the first sidelink transmission is performed; and in a case where the second physical uplink control channel is not transmitted, the downlink control information is transmitted by the network device to schedule the terminal equipment to perform the first sidelink transmission.

In some embodiments, the first sidelink transmission and the second sidelink transmission have the same hybrid automatic repeat request process identifier.

In some embodiments, a new data indication field of the downlink control information with the cyclic redundancy check being scrambled by the sidelink radio network temporary identifier does not toggle, a value of a new data indication field of the downlink control information with the cyclic redundancy check being scrambled by the sidelink configuration scheduling radio network temporary identifier is 1.

In some embodiments, a priority of the second indication information is determined according to a priority indication field in the physical sidelink control channel.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 800 for transmitting sidelink feedback information may further include other components or modules, and reference may be made to related techniques for particulars of these components or modules.

Furthermore, for the sake of simplicity, connection relationships between the components or modules or signal profiles thereof are only illustrated in FIG. 8. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment feeds back the indication information (ACK) on the PUCCH associated with the resource having no data to be transmitted, and the priority of the indication information is preconfigured. Hence, erroneously continuously scheduling resources by the network device may be reduced or avoided, and waste of sidelink resources may be lowered.

Embodiments of a Fifth Aspect

The embodiments of this disclosure provide an apparatus for receiving sidelink feedback information. The apparatus may be, for example, a network device, or may be one or more components or assemblies configured in a network device. Contents in the embodiments identical to those in the embodiments of the third aspect shall not be described herein any further.

Figure 9:
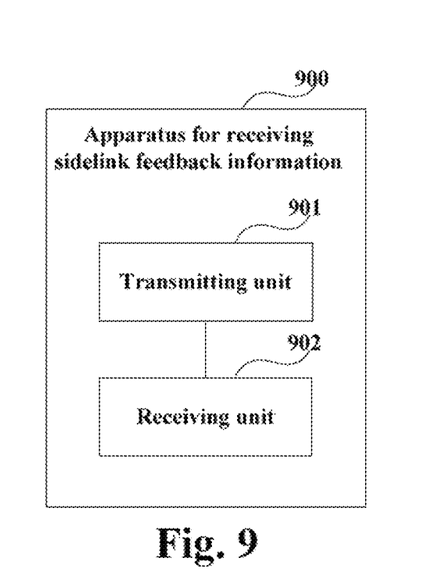
FIG. 9 is a schematic diagram of the apparatus for receiving sidelink feedback information of an embodiment of this disclosure.

FIG. 9 is a schematic diagram of the apparatus for receiving sidelink feedback information of an embodiment of this disclosure. As shown in FIG. 9, the apparatus 900 for receiving sidelink feedback information includes:

a transmitting unit 901 configured to transmit downlink control information with cyclic redundancy check being scrambled by a sidelink radio network temporary identifier or a sidelink configuration scheduling radio network temporary identifier; wherein the downlink control information indicates a dynamic grant resource and schedules a terminal equipment to perform sidelink transmission by using the dynamic grant resource; and a receiving unit 902 configured to receive indication information transmitted via a physical uplink control channel indicated by the downlink control information;

wherein the dynamic grant resource scheduled by the downlink control information is not used by the terminal equipment to perform the sidelink transmission, the indication information is used by the terminal equipment to indicate that the sidelink transmission is successful or that a network device is not needed to schedule retransmission, and a priority of the indication information is preconfigured.

In some embodiments, the priority of the indication information is preconfigured as a lowest sidelink priority.

In some embodiments, a priority of the physical uplink control channel is determined at least according to the priority of the indication information.

In some embodiments, the physical uplink control channel carries only the indication information, and the priority of the physical uplink control channel is equal to the priority of the indication information.

In some embodiments, the physical uplink control channel carries multiple pieces of feedback information, and the priority of the physical uplink control channel is equal to a highest priority of the multiple pieces of feedback information carried by the physical uplink control channel.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 900 for receiving sidelink feedback information may further include other components or modules, and reference may be made to related techniques for particulars of these components or modules.

Furthermore, for the sake of simplicity, connection relationships between the components or modules or signal profiles thereof are only illustrated in FIG. 9. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment feeds back the indication information (ACK) on the PUCCH associated with the resource having no data to be transmitted, and the priority of the indication information is preconfigured. Hence, erroneously continuously scheduling resources by the network device may be reduced or avoided, and waste of sidelink resources may be lowered.

Embodiments of a Sixth Aspect

The embodiments of this disclosure provide a communication system, and reference may be made to FIG. 1, with contents identical to those in the embodiments of the first to the fourth aspects being not going to be described herein any further. The communication system may include:

a terminal equipment configured to receive downlink control information with cyclic redundancy check being scrambled by a sidelink radio network temporary identifier or a sidelink configuration scheduling radio network temporary identifier; generate first indication information used for indicating that the first sidelink transmission is successful or that a network device is not needed to schedule retransmission; and transmit the first indication information via a first physical uplink control channel indicated by the downlink control information; and a network device configured to transmit the downlink control information and receive the indication information;

wherein the dynamic grant resource scheduled by the downlink control information is not used by the terminal equipment to perform the sidelink transmission, the indication information is used by the terminal equipment to indicate that the sidelink transmission is successful or that a network device is not needed to schedule retransmission, and a priority of the indication information is preconfigured.

The embodiments of this disclosure further provide a network device, which may be, for example, a base station. However, this disclosure is not limited thereto, and it may also be another network device.

Figure 10:
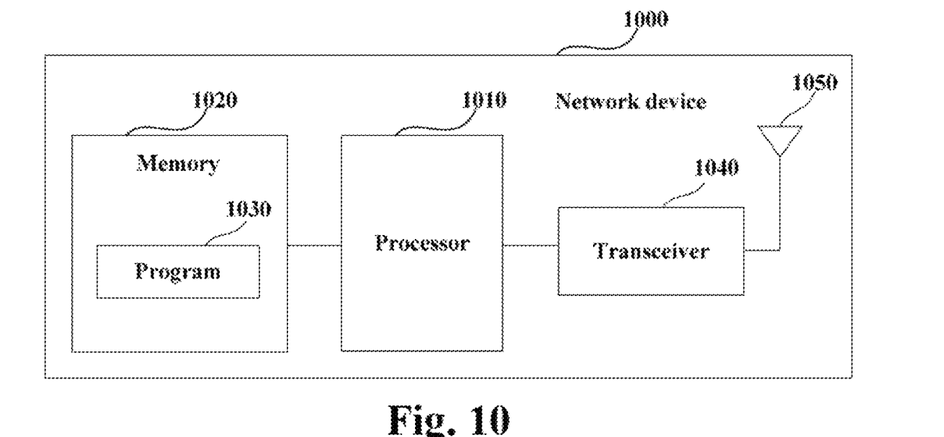
FIG. 10 is a schematic diagram of the network device of an embodiment of this disclosure.

FIG. 10 is a schematic diagram of the network device of the embodiment of this disclosure. As shown in FIG. 10, the network device 1000 may include a processor 1010 (such as a central processing unit (CPU)) and a memory 1020, the memory 1020 being coupled to the processor 1010. The memory 1020 may store various data, and furthermore, it may store a program 1030 for information processing, and execute the program 1030 under control of the processor 1010.

For example, the processor 1010 may be configured to execute the program to carry out the method for receiving sidelink feedback information as described in the embodiment of the third aspect. For example, the processor 1010 may be configured to execute the following control: transmitting downlink control information with cyclic redundancy check being scrambled by a sidelink radio network temporary identifier or a sidelink configuration scheduling radio network temporary identifier; and receiving indication information transmitted via a physical uplink control channel indicated by the downlink control information; wherein the dynamic grant resource scheduled by the downlink control information is not used by the terminal equipment to perform the sidelink transmission, the indication information is used by a terminal equipment to indicate that the sidelink transmission is successful or that a network device is not needed to schedule retransmission, and a priority of the indication information is preconfigured.

Furthermore, as shown in FIG. 10, the network device 1000 may include a transceiver 1040, and an antenna 1050, etc. Functions of the above components are similar to those in the relevant art, and shall not be described herein any further. It should be noted that the network device 1000 does not necessarily include all the parts shown in FIG. 10, and furthermore, the network device 1000 may include parts not shown in FIG. 10, and the relevant art may be referred to.

The embodiments of this disclosure further provide a terminal equipment; however, this disclosure is not limited thereto, and it may also be another equipment.

Figure 11:
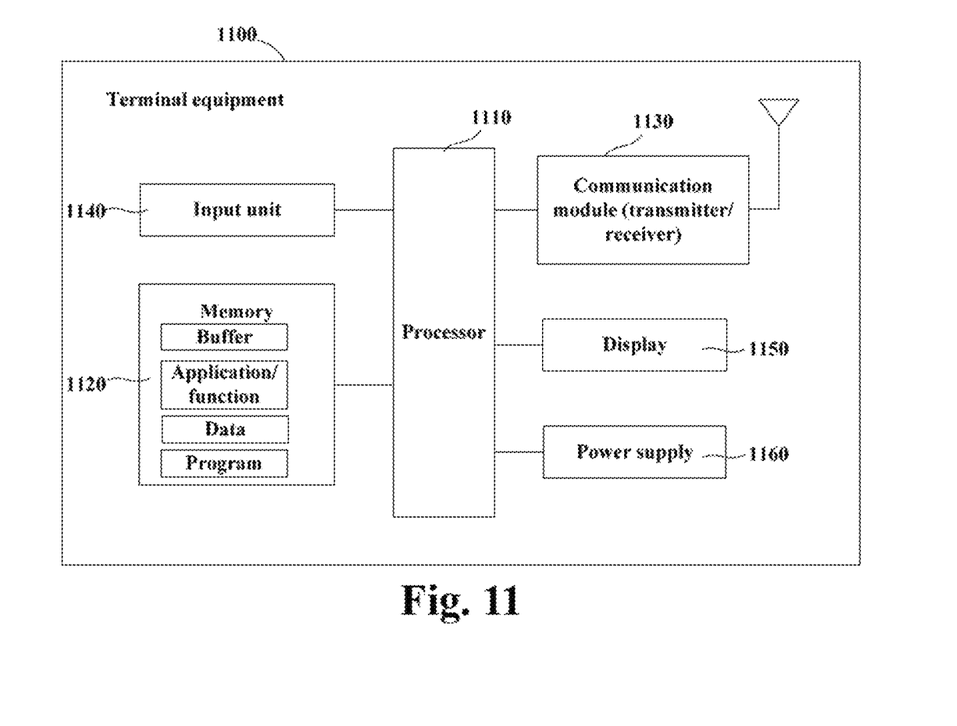
FIG. 11 is a schematic diagram of the terminal equipment of an embodiment of this disclosure

FIG. 11 is a schematic diagram of the terminal equipment of the embodiment of this disclosure. As shown in FIG. 11, the terminal equipment 1100 may include a processor 1110 and a memory 1120, the memory 1120 storing data and a program and being coupled to the processor 1110. It should be noted that this figure is illustrative only, and other types of structures may also be used, so as to supplement or replace this structure and achieve a telecommunications function or other functions.

For example, the processor 1110 may be configured to execute a program to carry out the methods for transmitting sidelink feedback information as described in the embodiments of the first and second aspects. For example, the processor 1110 may be configured to perform the following control: receiving downlink control information with cyclic redundancy check being scrambled by a sidelink radio network temporary identifier or a sidelink configuration scheduling radio network temporary identifier; generating first indication information used for indicating that the first sidelink transmission is successful or that a network device is not needed to schedule retransmission, wherein the first sidelink transmission is not performed on the dynamic grant resource scheduled by the downlink control information, and a priority of the first indication information is preconfigured; and transmitting the first indication information via a first physical uplink control channel indicated by the downlink control information.

As shown in FIG. 11, the terminal equipment 1100 may further include a communication module 1130, an input unit 1140, a display 1150, and a power supply 1160; wherein functions of the above components are similar to those in the relevant art, which shall not be described herein any further. It should be noted that the terminal equipment 1100 does not necessarily include all the parts shown in FIG. 11, and the above components are not necessary. Furthermore, the terminal equipment 1100 may include parts not shown in FIG. 11, and the relevant art may be referred to.

An embodiment of this disclosure provides a computer program, which, when executed in a terminal equipment, will cause the terminal equipment to carry out the method for transmitting sidelink feedback information as described in the embodiments of the first and second aspects.

An embodiment of this disclosure provides a computer readable medium, including a computer program, which will cause a terminal equipment to carry out the method for transmitting sidelink feedback information as described in the embodiments of the first and second aspects.

An embodiment of this disclosure provides a computer program, which, when executed in a network device, will cause the network device to carry out the method for receiving sidelink feedback information as described in the embodiment of the third aspect.

An embodiment of this disclosure provides a computer readable medium, including a computer program, which will cause a network device to carry out the method for receiving sidelink feedback information as described in the embodiment of the third aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for transmitting sidelink feedback information, including:
receiving, by a terminal equipment, downlink control information (DCI) with cyclic redundancy check (CRC) being scrambled by a sidelink radio network temporary identifier (SL-RNTI) or a sidelink configuration scheduling radio network temporary identifier (SL-CS-RNTI); wherein the downlink control information indicates a dynamic grant resource and schedules a terminal equipment to perform first sidelink transmission by using the dynamic grant resource;
generating first indication information used for indicating that the first sidelink transmission is successful or that a network device is not needed to schedule retransmission, wherein the first sidelink transmission is not performed on the dynamic grant resource scheduled by the downlink control information, and a priority of the first indication information is preconfigured; and
transmitting the first indication information via a first physical uplink control channel indicated by the downlink control information.

Supplement 2. The method according to supplement 1, wherein the method further includes:
performing priority comparison on channels or signals to determine whether the first physical uplink control channel indicated by the downlink control information is able to be transmitted; wherein, a priority of the first physical uplink control channel is determined at least according to a priority of the first indication information.

Supplement 3. The method according to supplement 2, wherein the method further includes:
not transmitting the first physical uplink control channel carrying the first indication information in a case where the first physical uplink control channel indicated by the downlink control information is unable to be transmitted.

Supplement 4. The method according to supplement 2, wherein the method further includes:
transmitting channels or signals overlapping with the first physical uplink control channel in a case where the first physical uplink control channel indicated by the downlink control information is unable to be transmitted.

Supplement 5. The method according to any one of supplements 1-4, wherein the priority of the first indication information is preconfigured as a lowest sidelink priority.

Supplement 6. The method according to any one of supplements 1-5, wherein the first physical uplink control channel carries only the first indication information.

Supplement 7. The method according to supplement 6, wherein the priority of the first physical uplink control channel is equal to the priority of the first indication information.

Supplement 8. The method according to any one of supplements 1-7, wherein the first physical uplink control channel carries multiple pieces of feedback information including the first indication information.

Supplement 9. The method according to supplement 8, wherein the priority of the first physical uplink control channel is equal to a highest priority of the multiple pieces of feedback information carried by the first physical uplink control channel.

Supplement 10. The method according to any one of supplements 1-9, wherein the method further includes:
performing second sidelink transmission by the terminal equipment via a physical sidelink control channel and/or a physical sidelink shared channel by using a dynamic grant resource or a configured grant resource;
via a physical sidelink feedback channel, receiving second indication information used for indicating that the second sidelink transmission is successful; and
performing priority comparison on channels or signals and determining that a second physical uplink control channel carrying the second indication information is unable to be transmitted.

Supplement 11. The method according to supplement 10, wherein the second sidelink transmission is performed before the first sidelink transmission is performed;
and in a case where the second physical uplink control channel is not transmitted, the downlink control information is transmitted by the network device to schedule the terminal equipment to perform the first sidelink transmission.

Supplement 12. The method according to supplement 10 or 11, wherein the first sidelink transmission and the second sidelink transmission have the same hybrid automatic repeat request process identifier.

Supplement 13. The method according to any one of supplements 10-12, wherein a priority of the second indication information is determined according to a priority indication field I the physical sidelink control channel.

Supplement 14. The method according to any one of supplements 1-13, wherein a new data indication (NDI) field of the DCI scrambled by the SL-RNTI does not toggle (NDI does not toggle), a value of the NDI field of the DCI scrambled by the SL-RNTI is 1.

Supplement 15. A method for transmitting sidelink feedback information, including:
receiving by a terminal equipment, downlink control information with cyclic redundancy check being scrambled by a sidelink radio network temporary identifier or a sidelink configuration scheduling radio network temporary identifier; wherein the downlink control information indicates a dynamic grant resource and schedules the terminal equipment to perform first sidelink transmission by using the dynamic grant resource;
generating first indication information used for indicating that the first sidelink transmission is successful or that a network device is not needed to schedule retransmission, wherein the first sidelink transmission is not performed on the dynamic grant resource, and a priority of the first indication information is preconfigured; and
transmitting a channel or a signal which is overlapped with a first physical uplink control channel indicated by the downlink control information.

Supplement 16. The method according to supplement 15, wherein the method further includes:
performing priority comparison on channels or signals to determine whether the first physical uplink control channel indicated by the downlink control information is able to be transmitted; wherein, a priority of the first physical uplink control channel is determined at least according to a priority of the first indication information.

Supplement 17. The method according to supplements 15 or 16, wherein the method further includes:
transmitting the first indication information via the first physical uplink control channel in a case where the first physical uplink control channel indicated by the downlink control information is able to be transmitted.

Supplement 18. The method according to supplements 15 or 16, wherein the method further includes:
not transmitting the first physical uplink control channel carrying the first indication information in a case where the first physical uplink control channel indicated by the downlink control information is unable to be transmitted.

Supplement 19. A method for transmitting sidelink feedback information, including:
generating by a terminal equipment, indication information (NACK) used for indicating that a sidelink transmission is unsuccessful, wherein sidelink data of the sidelink transmission is not transmitted; and
transmitting by the terminal equipment, the indication information (NACK) via a physical uplink control channel, wherein a priority of the indication information is equal to a priority of a logical channel of the sidelink data.

Supplement 20. A method for receiving sidelink feedback information, including:
transmitting, by a network device, downlink control information (DCI) with cyclic redundancy check (CRC) being scrambled by a sidelink radio network temporary identifier (SL-RNTI) or a sidelink configuration scheduling radio network temporary identifier (SL-CS-RNTI); wherein the downlink control information indicates a dynamic grant resource and schedules a terminal equipment to perform sidelink transmission by using the dynamic grant resource; and receiving indication information transmitted via a physical uplink control channel indicated by the downlink control information;
wherein the dynamic grant resource scheduled by the downlink control information is not used by the terminal equipment to perform the sidelink transmission, the indication information is used by the terminal equipment to indicate that the sidelink transmission is successful or that a network device is not needed to schedule retransmission, and a priority of the indication information is preconfigured.

Supplement 21. The method according to supplement 20, wherein the priority of the indication information is preconfigured as a lowest sidelink priority.

Supplement 22. The method according to supplement 20 or 21, wherein a priority of the physical uplink control channel is determined at least according to the priority of the indication information.

Supplement 23. The method according to any one of supplements 20-22, wherein the first physical uplink control channel carries only the first indication information.

Supplement 24. The method according to supplement 23, wherein the priority of the physical uplink control channel is equal to the priority of the indication information.

Supplement 25. The method according to any one of supplements 20-24, wherein the physical uplink control channel carries multiple pieces of feedback information.

Supplement 26. The method according to supplement 21, wherein the priority of the physical uplink control channel is equal to a highest priority of the multiple pieces of feedback information carried by the physical uplink control channel.

Supplement 27. The method according to any one of supplements 20-26, wherein a new data indication (NDI) field of the DCI scrambled by the SL-RNTI does not toggle (NDI does not toggle), a value of the NDI field of the DCI scrambled by the SL-RNTI is 1.

Supplement 28. A terminal equipment, including a memory and a processor, the memory storing a computer program, and the processor being configured to execute the computer program to carry out the method for transmitting sidelink feedback information as described in any one of supplements 1-20.

Supplement 29. A network device, including a memory and a processor, the memory storing a computer program, and the processor being configured to execute the computer program to carry out the method for receiving sidelink feedback information as described in any one of supplements 21-27.

What is claimed is:

1. An apparatus for transmitting sidelink feedback information, comprising:
a receiver configured to receive downlink control information with cyclic redundancy check being scrambled by a sidelink radio network temporary identifier or a sidelink configuration scheduling radio network temporary identifier,
the downlink control information including resource information and being used for a dynamic grant to schedule a terminal equipment to perform first sidelink transmission by using a dynamic grant resource according to the resource information;
processor circuitry configured to generate acknowledgment (ACK) when the first sidelink transmission is not performed on the dynamic grant resource provided by the downlink control information; and
a transmitter configured to transmit the acknowledgment (ACK) via a first physical uplink control channel.

2. The apparatus according to claim 1, wherein
the processor circuitry is configured to perform priority comparison on channels or signals to determine whether the first physical uplink control channel is able to be transmitted, wherein a priority of the first physical uplink control channel is determined at least according to a priority of the acknowledgment (ACK).

3. The apparatus according to claim 1, wherein a priority of the acknowledgment (ACK) is configured according to at least one of one or more sidelink priorities.

4. The apparatus according to claim 3, wherein the priority of the acknowledgment (ACK) is configured as a lowest sidelink priority among the one or more sidelink priorities.

5. The apparatus according to claim 1, wherein the transmitter is configured to transmit the acknowledgment (ACK) via the first physical uplink control channel by using an uplink resource indicated by the downlink control information.

6. The apparatus according to claim 1, wherein the processor circuitry is further configured to generate negative acknowledgment (NACK) when a third sidelink transmission is not performed based on prioritization, and
the transmitter is further configured to transmit the negative acknowledgment (NACK) via a second physical uplink control channel, wherein a priority of the negative acknowledgment (NACK) is corresponding to a priority of a logical channel of the third sidelink transmission.

7. The apparatus according to claim 1, wherein the first physical uplink control channel includes a plurality of feedback information comprising the acknowledgment (ACK).

8. The apparatus according to claim 7, wherein a priority of the first physical uplink control channel is equal to a highest priority of the plurality of feedback information.

9. The apparatus according to claim 2, wherein
the transmitter is further configured to perform second sidelink transmission via a physical sidelink control channel and/or a physical sidelink shared channel by using a dynamic grant resource or a configured grant resource;
the receiver is further configured to, via a physical sidelink feedback channel, receive second indication information used for indicating that the second sidelink transmission is successful; and
the processor circuitry is further configured to perform priority comparison on channels or signals and determine that a second physical uplink control channel carrying the second indication information is unable to be transmitted.

10. The apparatus according to claim 9, wherein the second sidelink transmission is performed before the first sidelink transmission is performed, and
in a case where the second physical uplink control channel is not transmitted, the downlink control information is transmitted by the network device to schedule the terminal equipment to perform the first sidelink transmission.

11. The apparatus according to claim 9, wherein the first sidelink transmission and the second sidelink transmission have the same hybrid automatic repeat request process identifier.

12. The apparatus according to claim 1, wherein a new data indication field of the downlink control information with the cyclic redundancy check being scrambled by the sidelink radio network temporary identifier does not toggle, a value of a new data indication field of the downlink control information with the cyclic redundancy check being scrambled by the sidelink configuration scheduling radio network temporary identifier is 1.

13. The apparatus according to claim 9, wherein a priority of the second indication information is determined according to a priority indication field in the physical sidelink control channel.

14. An apparatus for receiving sidelink feedback information, comprising:
- a transmitter configured to transmit downlink control information with cyclic redundancy check being scrambled by a sidelink radio network temporary identifier or a sidelink configuration scheduling radio network temporary identifier,
  - the downlink control information including resource information and being used for a dynamic grant to schedule a terminal equipment to perform sidelink transmission by using a dynamic grant resource according to the resource information; and
- a receiver configured to receive acknowledgment (ACK) transmitted via a physical uplink control channel wherein the acknowledgment (ACK) is generated by the terminal equipment when the sidelink transmission is not performed on the dynamic grant resource provided by the downlink control information.

15. The apparatus according to claim 14, wherein a priority of the acknowledgment (ACK) is configured as a lowest sidelink priority among one or more sidelink priorities.

16. The apparatus according to claim 14, wherein the receiver is further configured to receive the acknowledgment (ACK) via a first physical uplink control channel transmitted by using an uplink resource indicated by the downlink control information.

17. The apparatus according to claim 14, wherein the receiver is further configured to receive negative acknowledgment (NACK) via a second physical uplink control channel; and
- the negative acknowledgment (NACK) is generated by the terminal equipment when a third sidelink transmission is not performed based on prioritization, wherein a priority of the negative acknowledgment (NACK) is corresponding to a priority of a logical channel of the third sidelink transmission.

18. The apparatus according to claim 14, wherein the physical uplink control channel includes a plurality of feedback information comprising the acknowledgment (ACK).

19. The apparatus according to claim 18, wherein a priority of the physical uplink control channel is equal to a highest priority of the plurality of feedback information.

20. A communication system, comprising:
- a terminal equipment configured to:
  - receive downlink control information with cyclic redundancy check being scrambled by a sidelink radio network temporary identifier or a sidelink configuration scheduling radio network temporary identifier,
    - the downlink control information including resource information and being used for a dynamic grant to schedule a terminal equipment to perform first sidelink transmission by using a resource according to the dynamic grant resource information,
  - generate acknowledgment (ACK) when the first sidelink transmission is not performed on the resource provided by the downlink control information, and
  - transmit the acknowledgment (ACK) via a physical uplink control channel; and
- a network device configured to transmit the downlink control information and receive the acknowledgment (ACK).

* * * * *